(12) United States Patent
Henksmeier et al.

(10) Patent No.: US 8,382,128 B2
(45) Date of Patent: Feb. 26, 2013

(54) AXLE ARRANGEMENT

(75) Inventors: Thomas Henksmeier, Wadersloh (DE); Erik Hochapfel, Gudensberg (DE)

(73) Assignee: Benteler Automobiltechnik GmbH, Paderborn (DE)

( * ) Notice: Subject to any disclaimer, the term of this patent is extended or adjusted under 35 U.S.C. 154(b) by 83 days.

(21) Appl. No.: 13/038,522

(22) Filed: Mar. 2, 2011

(65) Prior Publication Data

US 2011/0285101 A1  Nov. 24, 2011

(30) Foreign Application Priority Data

May 18, 2010 (DE) .......... 10 2010 020 816

(51) Int. Cl.
 *B62D 17/00* (2006.01)
(52) U.S. Cl. ............... 280/86.758; 280/86.75
(58) Field of Classification Search ............... 280/86.75, 280/86.751, 86.754, 86.758, 124.1, 124.125
 See application file for complete search history.

(56) References Cited

U.S. PATENT DOCUMENTS

| | | | | |
|---|---|---|---|---|
| 2,065,071 A * | 12/1936 | Harris | ...................... | 280/86.757 |
| 3,819,202 A * | 6/1974 | Castoe | ...................... | 280/86.757 |
| 4,650,208 A * | 3/1987 | Mason | ...................... | 280/86.757 |
| 5,549,319 A * | 8/1996 | Kring | ...................... | 280/86.75 |
| 5,826,894 A * | 10/1998 | McDonald et al. | ...... | 280/86.756 |
| 6,382,645 B1 * | 5/2002 | Gravelle et al. | ......... | 280/86.754 |
| 6,409,189 B1 * | 6/2002 | Orimoto et al. | .......... | 280/86.751 |
| 6,676,142 B2 * | 1/2004 | Allman et al. | ........... | 280/86.751 |
| 7,111,855 B2 * | 9/2006 | Winkler et al. | .......... | 280/86.754 |
| 7,278,648 B2 * | 10/2007 | Bobbitt et al. | ........... | 280/86.751 |
| 7,334,805 B2 * | 2/2008 | Nam | ....................... | 280/86.753 |
| 7,513,514 B1 * | 4/2009 | Schlosser et al. | ........ | 280/93.511 |
| 2002/0190516 A1 | 12/2002 | Henksmeier et al. | | |
| 2003/0227151 A1 * | 12/2003 | Schreiber et al. | ........ | 280/86.751 |
| 2005/0001397 A1 * | 1/2005 | Genick, II | ............... | 280/86.754 |

FOREIGN PATENT DOCUMENTS

| | | |
|---|---|---|
| DE | 199 19 845 A1 | 11/2000 |
| DE | 102 42 195 A1 | 3/2004 |
| FR | 2 701 901 | 9/1994 |

* cited by examiner

*Primary Examiner* — Drew Brown
(74) *Attorney, Agent, or Firm* — Henry M. Feiereisen LLC

(57) ABSTRACT

An axle arrangement includes an axle member and an axle member bracket arranged on the axle member. A wheel suspension having a wheel carrier bracket is constructed in the form of a fork-shaped metal sheet and swingably supported on the axle member bracket for wheel alignment, with a wheel carrier being arranged on the wheel carrier bracket.

14 Claims, 3 Drawing Sheets

AXLE ARRANGEMENT

CROSS-REFERENCES TO RELATED APPLICATIONS

This application claims the priority of German Patent Application, Serial No. 10 2010 020 816.7, filed May 18, 2010, pursuant to 35 U.S.C. 119(a)-(d), the content of which is incorporated herein by reference in its entirety as if fully set forth herein.

BACKGROUND OF THE INVENTION

The present invention relates to an axle arrangement for a motor vehicle.

The following discussion of related art is provided to assist the reader in understanding the advantages of the invention, and is not to be construed as an admission that this related art is prior art to this invention.

Conventional wheel suspensions for motor vehicles include, i.a., attachment points to the vehicle body, bearings, at least one guide rod, suspension system, and wheel carrier secured to the guide rod. The guide rod can be designed as transverse control arm or semi-trailing arm. When a rigid axle is involved, springs in the form of leaf springs are oftentimes used. Rigid axles typically include rigid axle tubes which are linked to the wheel guiding longitudinal leaf springs via a fastening system, so called leaf spring attachments. The longitudinal leaf springs can be made of steel or composites such as GFRP (glass fiber reinforced plastic) or CFRP (carbon fiber reinforced plastic). The leaf springs are coupled to the body.

The rigid axle member is positioned in relation to the leaf springs normally via a center bolt which snaps into a bore of the lower leaf spring attachment. The rigid axle includes an axle tube and the outer wheel carriers which are securely fixed to the axle tube, e.g. welded or bolted.

When installing the rigid axle in the motor vehicle or during operation of the motor vehicle, the wheels do not always assume the desired position. Manufacturer's based tolerances lead to situations in which the rigid axles are not positioned at an orthogonal angle relative to the vehicle longitudinal axis and thus are skewed in relation to the typically adjustable axles with independent wheel suspension, mostly front axles. As a result, the front axle has to be readjusted possibly in opposition to the skewed disposition of the rear axle to ensure a straight travel of the vehicle. The tires which are also positioned at a slant are exposed to greater wear. This may be encountered in all four tires of the vehicle. Incorrect wheel position, especially incorrect toe, also increases fuel consumption. In addition, incorrectly aligned wheels can only transmit slight lateral guide forces and compromise safety in an extreme case. In particular the rear axle demands greater safety considerations because in the event the rear of the vehicle swerves and causes oversteering, uncontrollable driving conditions may arise.

It would therefore be desirable and advantageous to provide an improved axle arrangement which obviates prior art shortcomings and which is easy to manufacture while still being reliable in operation.

SUMMARY OF THE INVENTION

According to one aspect of the present invention, an axle arrangement, in particular a rigid axle arrangement, includes an axle member, an axle member bracket arranged on the axle member, and a wheel suspension having a wheel carrier bracket, constructed in the form of a fork-shaped metal sheet and swingably supported on the axle member bracket for wheel alignment, and a wheel carrier arranged on the wheel carrier bracket.

According to another advantageous feature of the present invention, the axle member bracket may also be constructed in the form of a fork-shaped metal sheet. Constructing the wheel carrier bracket and/or axle member bracket in the form of a fork-shaped metal sheet reduces weight and thereby decreases fuel consumption as well as provides benefits on the side of the unsprung wheel with respect to agility and comfort. The presence of a pivotable support of the wheel carrier bracket enables to adjust the toe of a vehicle axle. As the wheel carrier bracket pivots, the wheel carrier that is securely fixed thereto swings at the same time and thereby is able to change the toe direction of the vehicle wheel. This is beneficial because the toe can be adjusted during initial installation of the axle arrangement and can be readjusted during repair work. As a result of the attained optimum toe adjustment of all wheels, tire wear and fuel consumption is minimized and safe travel conditions of the chassis are ensured.

According to another advantageous feature of the present invention, two couplers can be provided for linking the wheel carrier bracket to the axle member bracket, with the couplers being oriented substantially orthogonal to a longitudinal axis of the axle member. The couplers can be arranged substantially parallel to the vehicle longitudinal axis, and in particular parallel to the vehicle vertical axis. It is however also possible to arrange the couplers at any suitable angle between longitudinal axis and vertical axis. As the wheel carrier bracket and the coupled wheel carrier of the motor vehicle can be adjusted, the toe and within certain limits also the camber can be adjusted in relation thereto. The provision of two couplers thus enables toe adjustment, whereby the couplers are secured in place as soon as the toe adjustment has been carried out.

According to another advantageous feature of the present invention, each coupler can be constructed in the form of a stud bolt, e.g. eccentric bolt. To ensure clarity, it is necessary to establish the definition of several important terms and expressions that will be used throughout this disclosure.

The term "stud bolt" is to be understood as relating to an elongated bolt-like member which may or may not include a thread. Currently preferred is the provision of a thread on which a nut is arranged to realize a form-fitting threaded securement of the stud bolt. Of course, it is also conceivable to engage a stud bolt in a threaded bore of the wheel carrier bracket or axle member bracket.

The term "eccentric bolt" relates to a bolt having one section which is configured rotationally symmetrical about the longitudinal bolt axis and another section which is eccentric to the one section. For example, the eccentric section may be provided in a region of a washer placed eccentrically relative to the screw nut. Likewise, the eccentric bolt may include an eccentric screw nut. An installer is thus able to attain a precise disposition of the wanted toe adjustment through turning the eccentric bolt and then to lock the eccentric bolt in place through friction-fitted connection of the couplers.

According to another advantageous feature of the present invention, the stud bolts may extend through installation openings of the axle member bracket and wheel carrier bracket, with the installation openings formed in limbs of the fork-shaped axle member bracket and wheel carrier bracket. The fork-shaped brackets thus engage in a clamp-like manner within one another and lead to a substantially rectangular cross section. Installation openings may be through bores or blind bores arranged in the limbs of the fork-shaped brackets. Through bores of the brackets thus are positioned above one another and are traversed by the bolts to attain a formfitting securement. The installation openings can be sized for the couplers to extend therethrough without play or with play. As a result, various options to adjust the toe are established in view of the interaction of the installation components and the installation openings.

According to another advantageous feature of the present invention, any installation opening which is traversed by the eccentric bolt can be configured as an oblong hole in the wheel carrier bracket and/or axle member bracket. This too provides various options for toe adjustment in cooperation with the eccentric bolt. Turning the eccentric bolt causes a relative movement between the wheel carrier bracket and the axle member bracket. This relative movement requires play to enable freedom of movement of the eccentric bolt. This play is made possible by the presence of an oblong hole.

An axle arrangement according to the present invention can be manufactured in a cost-efficient manner. The use of any commercially available eccentric bolt is feasible that allows in cooperation with the afore-stated parameters a toe adjustment of a rigid vehicle axis and at the same time is cost-efficient and easy to manufacture.

According to another advantageous feature of the present invention, the oblong hole is defined by a longitudinal axis having a curvature defined by a radius which may correspond to a radius of a pivot circle described by a swinging movement of the wheel carrier bracket. Thus, a rotation of the eccentric bolt causes a swinging movement of the wheel carrier bracket about the longitudinal axis of the other coupler. To prevent the eccentric bolt to jam, the curvature of the oblong hole is configured to extend rotationally symmetrical with the pivot movement about the longitudinal axis of the other coupler.

According to another advantageous feature of the present invention, spacers may be disposed between the axle member bracket and wheel carrier bracket. Examples of spacers include distance sleeves. The spacers are provided to prevent the substantially fork-shaped brackets from deformation when secured by the couplers through friction fit and/or form-fit. In addition, the spacers provide a further frictional surface which acts on the bracket from the inner side thereof.

According to another advantageous feature of the present invention, the wheel carrier bracket and/or the axle member bracket may have formed thereon abutments for formfitting contact by the eccentric bolt. The abutments thus for example provide a counter-support surface for the eccentric section of the eccentric bolt. Turning the eccentric bolt causes the formation of an offset between the component secured by the eccentric bolt via the abutment and the component secured by the bolt shaft of the eccentric bolt.

The wheel carrier bracket and/or axle member bracket may be configured as metal sheet. This is easy and cost-efficient to produce and affords a beneficial freedom of design in connection with the configuration of the brackets. Examples of materials for the brackets include steel alloys or light metal alloys. Currently preferred is the use of steel material or aluminum material or magnesium material. The brackets may be configured as welded part or malleable part or forged part. Another example includes a cast construction.

Various wheel bearings can be coupled to the wheel carrier bracket. For example, a wheel bearing or wheel carrier may be press-fitted in the wheel carrier bracket or may be pressed on or threadably engaged or may be connected through welding.

According to another advantageous feature of the present invention, the abutments may be realized through a forming process and/or stamping process. Counter-support surfaces for the eccentric bolt can easily be manufactured through a simple shaping process such as forging, bending, stamping. It is, of course, also conceivable to configure counter-support surfaces for maximum limitation for toe adjustment and/or camber on the brackets.

According to another advantageous feature of the present invention, the wheel carrier bracket can pivot about one of the couplers when the eccentric bolt is turned.

An axle arrangement according to the present invention has a further benefit of being applicable, even when the axles are driven. Joints or also cardan joints already arranged in the drive shafts provide the required compensation in order to reduce stress encountered during toe adjustment through relative pivoting of wheel carrier to axle member. Thus, the present invention is also applicable for driven axles. The two fasteners, namely the stud bolt and the eccentric bolt in the event the other coupler is configured as eccentric bolt, may be arranged spaced apart at a distance sufficient to allow disposition of the drive shaft in midsection between these two fasteners.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
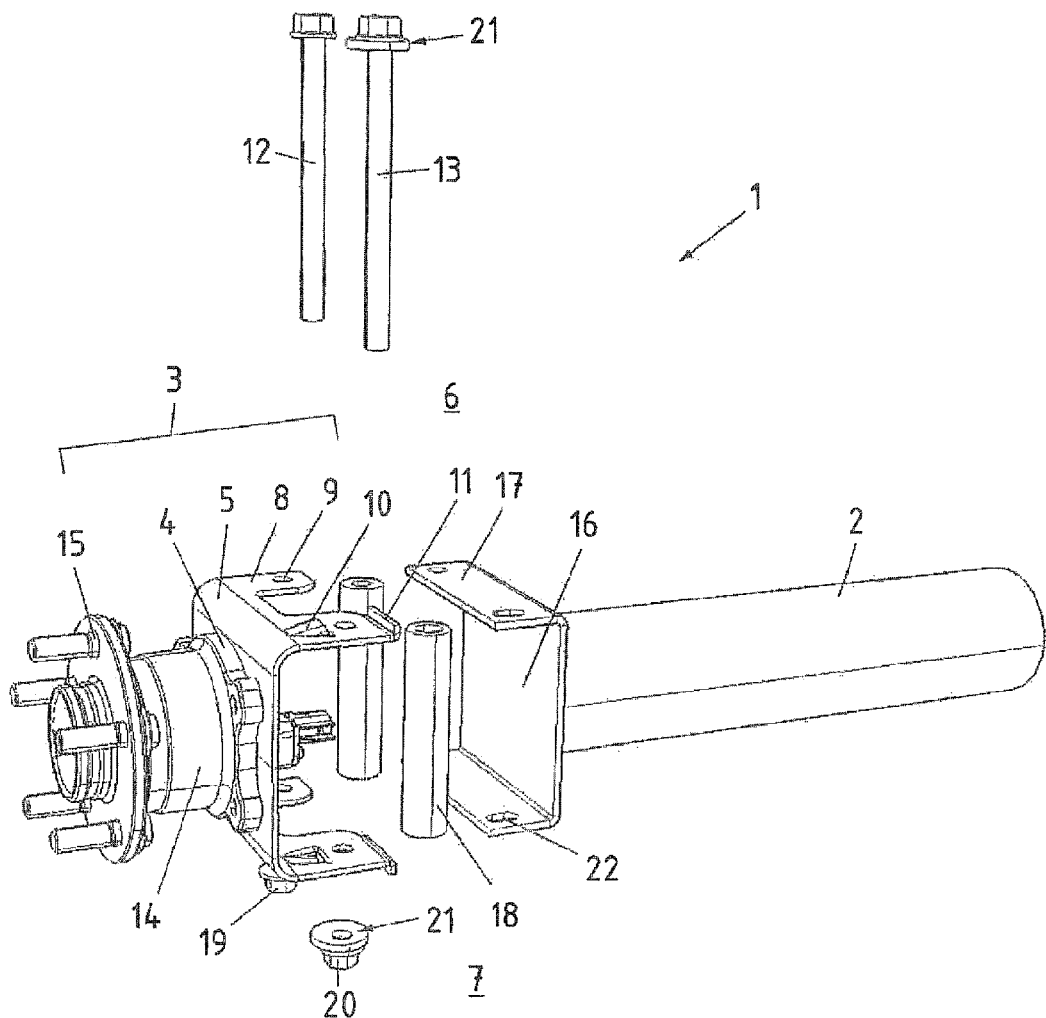
FIG. 1 is an exploded view of one embodiment of an axle arrangement according to the present invention.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown an exploded view of one embodiment of an axle arrangement according to the present invention, generally designated by reference numeral 1. The axle arrangement 1 includes an axle member 2 and a wheel suspension 3. The wheel suspension 3 includes a wheel carrier 4 and a wheel carrier bracket 5 coupled to the wheel carrier 4. The wheel carrier bracket 5 has a substantially fork-shaped configuration and has a topside 6 and a bottom side 7, as relating to the drawing plane, with the topside 6 and the bottom side 7 each having limbs 8 which are formed with installation openings 9. The wheel carrier bracket 5 further includes abutments in the form of outwardly projecting tabs 10 and bent edges 11 to provide counter-support surfaces. Two couplers, here by way of example a stud bolt 12 and an eccentric bolt 13, are provided to pass through the installation openings 9.

The wheel carrier 4 has a wheel hub 14 with a wheel hub flange 15. The wheel carrier bracket 5 is swingably supported on an axle member bracket 16 which, in turn, is coupled with the axle member 2. The axle member bracket 16 and the wheel carrier bracket 5 are coupled to one another by the stud bolt 12 and the eccentric bolt 13 through formfit and/or interference fit.

The axle member bracket 16 has also a fork-shaped configuration. In the non-limiting example involved here, the limbs 8 on the topside 6 and the bottom side 7 of the wheel carrier bracket 5 embrace the limbs 17 of the axle member bracket 16. Spacers in the form of spacer sleeves 18 are positioned between the limbs 17 of the axle member bracket 16 to prevent the limbs 17 of the axle member bracket 16 from bending as the stud bolt 12 and the eccentric bolt 13 are tightened. The stud bolt 12 and also the eccentric bolt 13 are threadably engaged via a stud bold nut 19 and an eccentric bolt nut 20, respectively, with the wheel carrier bracket 5 and the axle member bracket 16. The eccentric bolt nut 20 and the eccentric bolt 13 have an eccentric surface 21. As further shown in FIG. 1, one of the installation openings 9 of the axle member bracket 16 is configured in the form of an oblong hole 22 in the region of the eccentric bolt 13.

Figure 2:
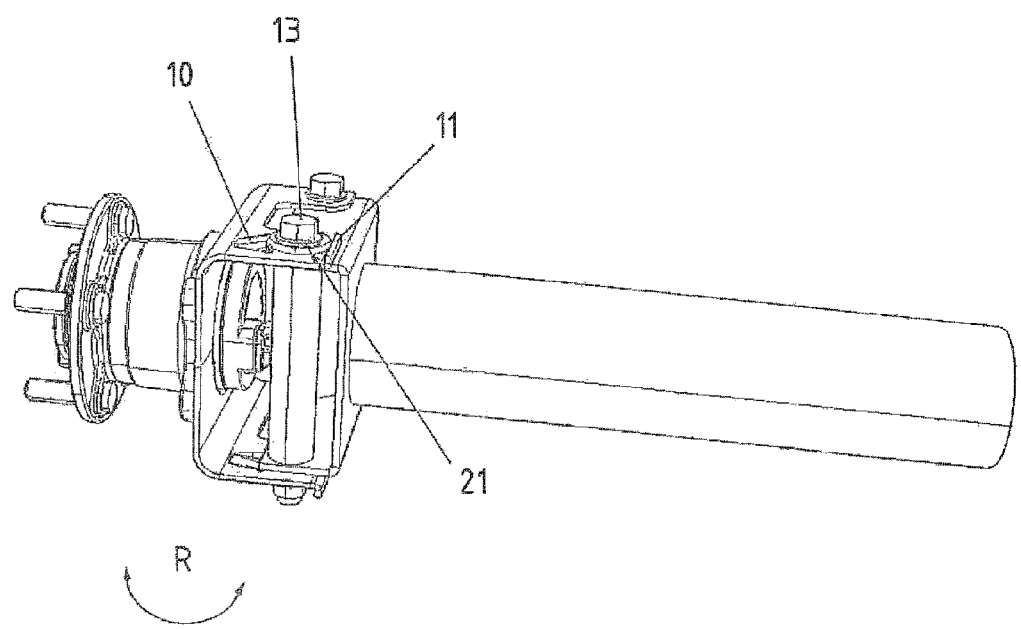
FIG. 2 is a perspective view of the axle arrangement as assembled.

FIG. 2 shows the axle arrangement 1 in assembled state. As can be seen, the eccentric surface 21 can be brought into formfitting contact with the tab 10 and the edge 11. A turning of the eccentric bolt 13 causes the eccentric surface 21 to contact the edges 11 and the tabs 10 to thereby swing the wheel carrier bracket 5 about the axle member bracket 16 by a relative movement, indicated by the double arrow R.

Figure 3:
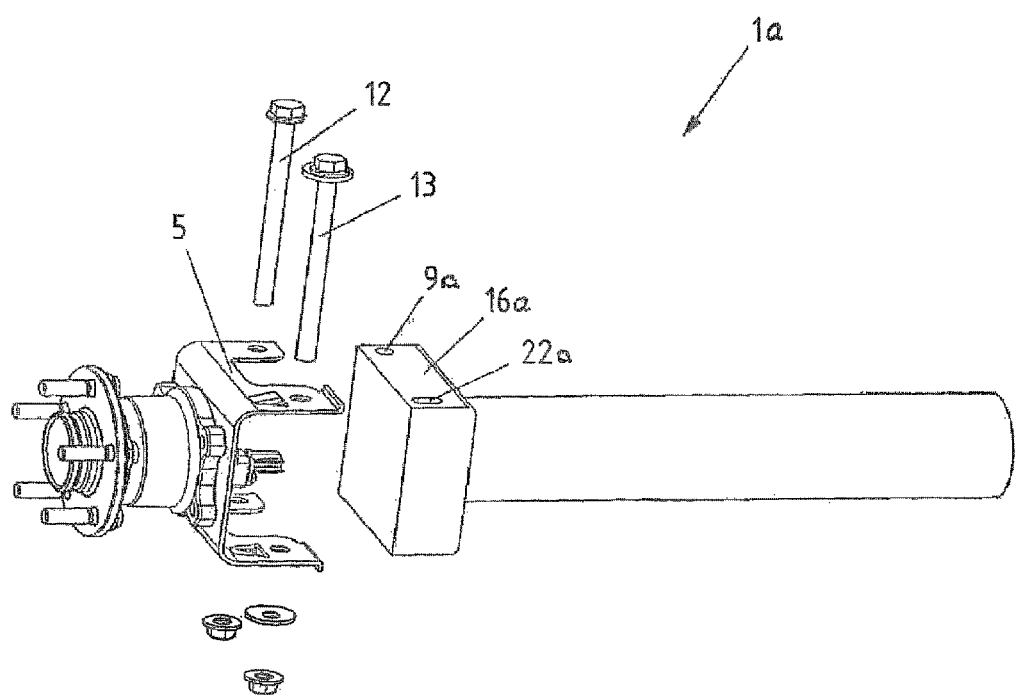
FIG. 3 is an exploded view of another embodiment of an axle arrangement according to the present invention.

Referring now to FIG. 3, there is shown an exploded view of another embodiment of an axle arrangement according to the present invention, generally designated by reference numeral 1*a*. In the following description, parts corresponding with those in FIG. 1 will be identified, where appropriate for the understanding of the invention, by corresponding reference numerals followed by an "a". In this embodiment, the axle arrangement 1*a* has an axle member bracket 16*a* which is configured as solid component and includes an installation opening 9*a* and an oblong hole 22*a* for receiving the stud bolt 12 and the eccentric bolt 13, respectively.

Although not shown in the drawings, it is, of course, also conceivable to configure the axle member bracket 16*a* as fork-shaped metal sheet like the axle member bracket 16 of FIG. 1 and to configure the wheel carrier bracket 5 as solid component.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. An axle arrangement, comprising:
    an axle member;
    an axle member bracket arranged on the axle member and constructed in the form of a fork-shaped metal sheet; and
    a wheel suspension having a wheel carrier bracket, constructed in the form of a fork-shaped metal sheet and swingably supported on the axle member bracket for wheel alignment, and a wheel carrier arranged on the wheel carrier bracket.

2. The axle arrangement of claim 1, constructed as rigid axle arrangement.

3. The axle arrangement of claim 1, further comprising spacers disposed between the axle member bracket and the wheel carrier bracket.

4. The axle arrangement of claim 3, wherein the spacers are constructed in the form of distance sleeves.

5. An axle arrangement, comprising:
    an axle member;
    an axle member bracket arranged on the axle member;
    a wheel suspension having a wheel carrier bracket, constructed in the form of a fork-shaped metal sheet and swingably supported on the axle member bracket for wheel alignment, and a wheel carrier arranged on the wheel carrier bracket; and
    two couplers for coupling the wheel carrier bracket to the axle member bracket, said couplers being oriented substantially orthogonal to a longitudinal axis of the axle member, wherein one of the couplers is constructed in the form of an eccentric bolt.

6. The axle arrangement of claim 5, wherein a turning of the eccentric bolt causes the wheel carrier bracket to pivot about the other one of the couplers.

7. The axle arrangement of claim 5, constructed as rigid axle arrangement.

8. An axle arrangement, comprising:
    an axle member;
    an axle member bracket arranged on the axle member; and
    a wheel suspension having a wheel carrier bracket, constructed in the form of a fork-shaped metal sheet and swingably supported on the axle member bracket for wheel alignment, and a wheel carrier arranged on the wheel carrier bracket; and
    two couplers for coupling the wheel carrier bracket to the axle member bracket, said couplers being oriented substantially orthogonal to a longitudinal axis of the axle member, each said coupler being constructed in the form of a stud bolt which extends through installation openings of the axle member bracket and wheel carrier bracket, with the installation openings formed in limbs of the axle member bracket and wheel carrier bracket, wherein at least one of the stud bolts is an eccentric bolt for traversal of one of the installation openings, wherein said one installation opening in at least one member selected from the group consisting of axle member bracket and wheel carrier bracket is configured as an oblong hole.

9. The axle arrangement of claim 8, wherein the oblong hole is defined by a longitudinal axis having a curvature defined by a radius corresponding to a radius of a pivot circle described by a swinging movement of the wheel carrier bracket.

10. The axle arrangement of claim 8, constructed as rigid axle arrangement.

11. An axle arrangement, comprising:
    an axle member;
    an axle member bracket arranged on the axle member;
    a wheel suspension having a wheel carrier bracket, constructed in the form of a fork-shaped metal sheet and swingably supported on the axle member bracket for wheel alignment, and a wheel carrier arranged on the wheel carrier bracket; and
    two couplers for coupling the wheel carrier bracket to the axle member bracket, said couplers being oriented substantially orthogonal to a longitudinal axis of the axle member, at least one of the couplers being constructed in the form of an eccentric bolt, at least one member selected from the group consisting of axle member bracket and wheel carrier bracket having formed thereon abutments for formfitting contact by the eccentric bolt.

12. The axle arrangement of claim 11, wherein the abutments are realized through a forming process and/or punching process.

13. The axle arrangement of claim 11, wherein the abutments are formed by outwardly projecting tabs and bent edges in a topside and a bottom side of the wheel carrier bracket.

14. The axle arrangement of claim 11, constructed as rigid axle arrangement.

\* \* \* \* \*